United States Patent Office 2,716,097
Patented Aug. 23, 1955

2,716,097

POLYMERS OF VINYL SUBSTITUTED BENZAL ACETOPHENONES

Cornelius C. Unruh and Charles F. H. Allen, Rochester, N. Y., assignors to Eastman Kodak Company, Rochester, N. Y., a corporation of New Jersey No Drawing. Application September 13, 1951, Serial No. 246,516

16 Claims. (Cl. 260—47)

This invention relates to the preparation of acylated vinyl polymers and more particularly to light-sensitive polymers of vinyl benzal acetophenones.

In the Allen et al. U. S. patent application, Serial No. 771,142, filed August 28, 1947, now U. S. Patent No. 2,566,302, granted September 4, 1951, are described light-sensitive polymers made by the acylation of a polymer such as polystyrene with cinnamoyl chloride. Since acylation apparently proceeds to a limited extent, a polymer is obtained such as one having the following formula:

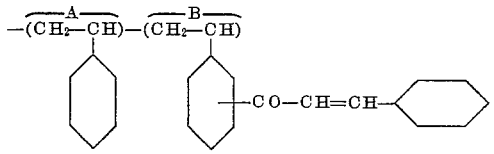

Polymers obtained by this method in which the molecular ratio of unit A to unit B is from 5:1 to 18:1 (16 to 5 mol percent vinylbenzalacetophenone units) are said to possess especially useful photographic properties including solvent solubility and light sensitivity rendering the polymers particularly useful in photomechanical processes.

We have discovered that if polymers of the above type are prepared in the manner of our invention, they are not only more soluble in organic solvents but possess much higher sensitivity to light.

The polymers of our invention are prepared by condensing a polymer of acylated vinyl benzenes and naphthalenes (acetylated ar-vinyl benzenes and naphthalenes in which the vinyl group is attached to an aromatic nucleus) with a nuclear-substituted benzaldehyde. This is accomplished in several ways. A polymer containing aromatic nuclei such as a polystyrene, polyvinyl naphthalene, α-methylstyrene or a copolymer thereof is partially or completely acylated by the Friedel-Crafts reaction and the resultant polymer is then condensed with preferably, but not necessarily, an excess of the selected aromatic aldehyde of the order of from about $\frac{1}{10}$ to about 25–50 mol of aldehyde per mol of the vinyl acetophenone monomer in the polymer, to yield the desired polyvinyl arylidene acetophenone. Alternately, a vinyl acetophenone, vinyl propiophenone etc. compound can be homopolymerized or copolymerized with other compounds containing a polymerizable —CH=C< group, particularly a CH₂=C< group, such as styrene, and the resultant polymer condensed with the aromatic aldehyde under consideration.

The following reactions illustrate methods for carrying out our invention:

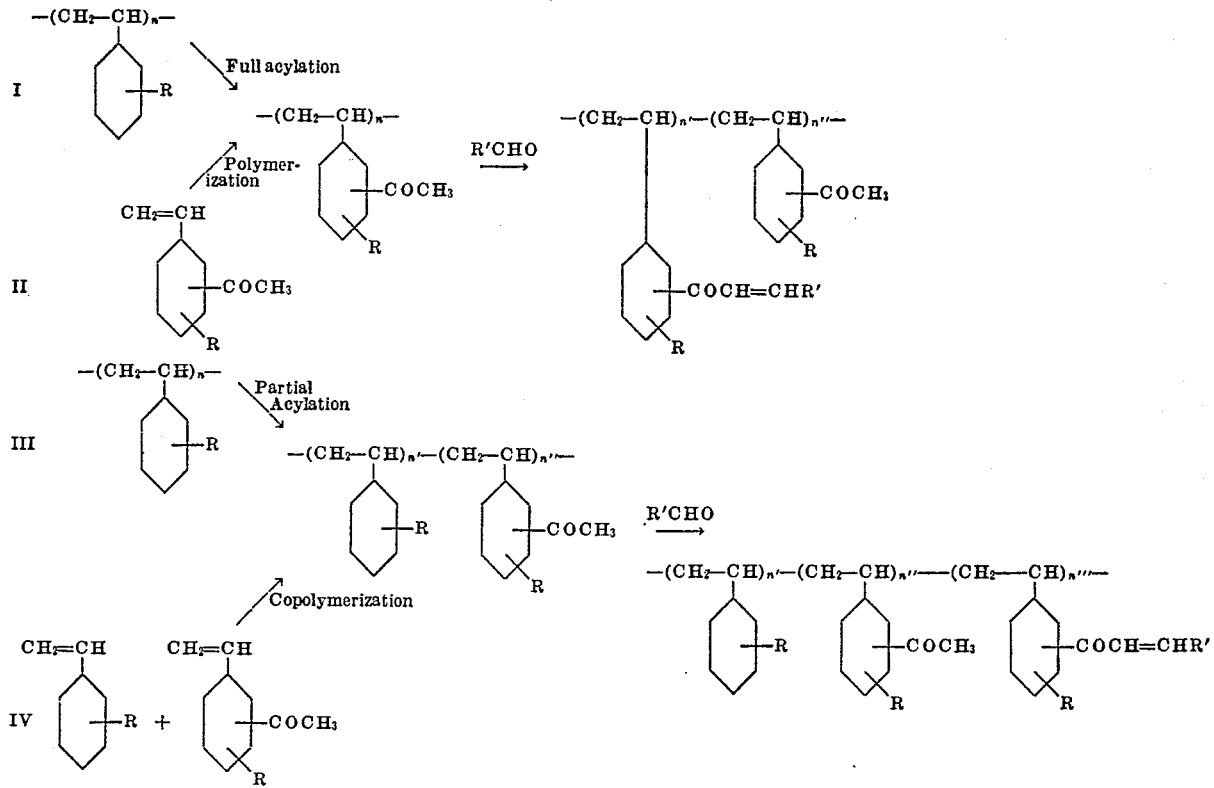

R' represents a phenyl or α or β naphthyl group preferably substituted with one or more groups such as o-methoxy, o-hydroxy, p-hydroxy, o-sulfo, o-chloro, etc.

R represents a group such as hydrogen, alkoxy and aryloxy e. g. o-methoxy, p-phenoxy, alkyl e. g. m. tert.-butyl and methyl, hydroxy e. g. o-hydroxy, halogen e. g. o-chloro, aralkyl e. g. p-benzyl. The nucleus can also be substituted with more than one of such groups e. g. 3,4-dichloro, 2,5-dimethyl, 2,5-dichloro, 3,4-dihydroxy, 2,3-dimethyl. Similarly such substituents may be present on a naphthalene nucelus when preparing the acylated vinylnaphthone polymers. When the polymer reacted with the aldehyde or mixture of aldehydes is obtained by acylation of a vinyl benzene or naphthalene polymer (method I and III) the acid halide used may be any one or a mixture of those containing 2–5 carbon atoms such as acetyl, propionyl, butyryl and valeryl chlorides. Acetyl chloride is preferred since the vinyl benzalacetophenone and acetonaphthone polymers are more light-sensitive than e. g. the vinyl benzalpropiophenone polymers. Where R is amino, hydroxyl, nitro, sulfo and carboxyl, methods II and IV are preferred.

Likewise, according to methods II and IV, the carbon chain of the ketone group of the monomeric compound preferably contains 2–5 carbon atoms. The Williams U. S. patent application Ser. No. 246,524, filed concurrently herewith, provides a convenient method for preparing these ketones for example from p-ethyl acetophenone or p-ethyl propiophenone. When R of the acylated compounds is amino, hydroxyl, sulfo and carboxyl, methods II and IV and the Williams procedure for preparing the ketone monomer is used.

In the formulas in the above chart the values for the integers $n$, $n'$, $n''$, and $n'''$ are dependent somewhat upon the molecular weight of the polymer reacted with the aldehyde. $n''$ in methods I and II and in methods III and IV can be positive integers, or equal to zero in case all of the acetyl groups of the polymer have been reacted with the aldehyde as shown in the examples following. In the formulas it will be apparent that when a mixture of aldehydes including benzaldehyde is reacted with the acylated polymer, the resultant polymer contains a mixture of vinyl aralacetophenone units.

When the polymers of our invention are obtained as described, regardless of the derivation of the particular acylated polymer which is condensed with the aromatic aldehyde, the resultant products are in general more sensitive to light than those produced by the methods of the Allen et al. invention. In making this comparison, sensitivity to light is determined by exposure of a layer of the polymer on a hydrophilic surface under a photographic step tablet to insolubilize the polymer in the exposed regions. After exposure, the least exposed areas are removed with a solvent for the polymer such as methyl ethyl ketone. The sensitometric characteristics of the undissolved polymer remaining in the form of a step tablet are then recorded by well-known photographic methods. From these values a speed value is assigned to the particular polymer under test. When tested by this method, representative polymers of the Allen et al. invention possess speeds of from 1.4 to 7 (made by reacting from 1:5 to 1:18 mol of cinnamoyl chloride per mol of polystyrene) whereas none of the polymers of our invention have speeds less than 7 and speeds of the order of 1000 to 2500 and higher are readily obtained by selection of the proper reactants and conditions of reaction.

A possible explanation for the fact that the polymers of our invention in general possess such relatively higher light sensitivity, lies partly in a belief that substantially no cross-linkages are formed in the polymers obtained by our methods. That is, it is believed that when a polymer containing aromatic nuclei is cinnamoylated by the methods of the Allen et al. invention, the catalyst utilized induces the formation of cross-linkages which reduce light sensitivity and which tend to insolubilize the polymer before very many cinnamoyl groups have been introduced into the molecule. On the contrary, by our methods we start from a polymer containing the desired proportion of vinyl acetophenone units. Subsequent reaction of the polymer with an aromatic aldehyde appears to yield a polymer substantially free of cross-linkages. By our methods we readily obtain polymers containing at least 21 mol percent of vinyl benzal acetophenone units and such resins, apparently due to the increased number of unsaturated groups present and freedom from cross-linkages, possess speeds of the order of 2500. Even vinyl benzal acetophenone polymers made from a copolymer such as a styrene-vinyl acetophenone copolymer (Example 17) which contains substantially less than 21 mol percent of light-sensitive groups, is very light sensitive. On this speed evaluation scale well-known dichromated colloid systems such as dichromated glue have a speed of the order of 30.

Furthermore, since we utilize nuclear-substituted benzaldehydes in the reaction, the substituent on the nucleus of the aldehyde may be exerting a profound effect not only upon the course of the reaction but also may be promoting the insolubilization of the polymer when it is exposed to light and thus increasing the light sensitivity.

In general, the preferred polymers of our invention are polymers of a compound having the general formula:

$$CH_2=CH-D-CO-CH=CH-Q$$

wherein D represents an aryl group of the benzene or naphthalene series substituted if desired as indicated above and Q is a phenyl or naphthyl group, or naphthyl or phenyl group substituted, for example, with the groups alkyl, alkoxyl, hydroxyl, halogen, acetamido, aryloxy, amino, sulfonic acid, etc.

For example, polymers of the following are contemplated by our invention:

Isopropylbenzal acetylstyrene
p-Hydroxybenzal acetylstyrene
p-Dimethylamino acetylstyrene
o-Chlorobenzal acetylstyrene
p-Acetamidobenzal acetylstyrene
p-Sulfobenzal acetylstyrene
Anisal acetylstyrene
Veratral acetylstyrene
Anisal acetyl-o-methoxystyrene
p-Hydroxybenzal acetyl-o-methoxystyrene
o-Chlorobenzal acetyl-o-chlorostyrene
p-Chlorobenzal acetyl-2,5-dimethylstyrene
Anisal acetyl-p-phenoxystyrene
Anisal acetyl-p-bromostyrene
Tolual acetyl 3,4-dimethoxystyrene
Anisal acetyl-o-fluorostyrene
α-Naphthal acetylstyrene
Anisal benzal-acetylstyrene
Anisalvinylmethyl ketone The latter compound is representative of other light-sensitive benzal acetyl and naphthal acetyl group-containing polymers made by condensing aromatic aldehydes with polymers containing acetyl groups, such as vinyl methyl ketone polymers and co-polymers. Other polymers also containing acetyl groups attached directly or indirectly to linear carbon atom polymer chains are utilized similarly. Anisal benzal acetylstyrene is representative of polymers obtained by reacting a mixture of aldehydes with the polymer containing acetyl groups.

Accordingly, the light-sensitive polymers contain the group $$-CH_2-CH-D-CO-C=CH-Q$$
$$\qquad\qquad\qquad\quad |$$
$$\qquad\qquad\qquad (CH_2)_{n-1}H$$

in which $n$ is a number from 1 to 4 and Q is nuclear substituted aryl group of the benzene or naphthalene series and D is a single bond or aryl group of the benzene or naphthalene series. When $n$ is 2 to 4 the structure obtained results from reaction of the aldehyde with the alpha methylene group of a ketone polymer such as polyvinyl propionphenone.

In general, the preferred polymers are obtained by condensing a polymer (homopolymer or copolymer) of a compound having the general formula:

$$CH_2=CH-D-CO-CH_3$$

wherein D is the same as above, in the presence of an acid or alkaline condensation catalyst, with a benzaldehyde, the nucleus of which contains the substituent of Q above. Preferably, but not necessarily, is used an excess of the aldehyde based upon the amount of vinyl acetophenone units present in the polymer molecule.

As described above, specific methods include acetylating, either partially or fully, aromatic nuclei of a styrene polymer (homopolymer or copolymer) and then condensing acetyl groups thereof with a benzaldehyde, or naphthaldehyde. Alternately, an acetylated styrene copolymer is obtained by copolymerization of a mixture of a vinyl acetophenone with a compound containing a polymerizable —CH=CH< or CH₂=C< group followed by condensing acyl groups of the copolymer with the selected nuclear-substituted aromatic aldehyde. Other acetyl-containing polymers are utilized similarly.

Condensation of the vinyl acetophenone or acetonaphthone polymer with the aldehyde is carried out in the presence of a dehydration catalyst such as acetic anhydride, phosphorous pentoxide, toluene sulfonic acid, mineral acid, for example, sulfuric acid, phosphoric acid, etc., and the basic condensation catalysts particularly organic bases such as the quaternary ammonium bases, for example, trimethyl benzyl ammonium hydroxide, tetramethyl and tetraethyl ammonium hydroxides, tetraethanol ammonium hydroxide and trimethyl benzyl ammonium butoxide.

As will be apparent from the following examples given as illustrative of the methods of our invention, condensation with the aldehyde is preferably conducted in the presence of a diluent, which should be a solvent for both the vinyl acetophenone or naphthone polymer, and the aldehyde in use, such as acetic acid, 1,4-dioxane or ketones such as benzophenone, etc. It is particularly desirable to use as the solvent large excesses of the aldehyde in addition to the primary solvent, or as in Example 2 to use only the aldehyde reactant as solvent which increases the amount of acetyl groups reacted with the aldehyde. It is advisable to use a diluent, otherwise in some cases the product tends to decrease in solubility during the course of the condensation. It is possible to employ as the diluent the original diluent used when making the vinyl acetophenone polymer or copolymer. That is, when vinyl acetophenone etc., is homopolymerized or copolymerized with another polymerizable compound in a diluent, the polymer need not be isolated but the polymerization mixture can immediately be reacted with the desired aldehyde without removal of the diluent. Any unpolymerized monomer which may remain in the polymerization mixture does no harm when the condensation is subsequently carried out in its presence. As a source of the aldehyde for the condensation reaction may be used the pure aldehydes or mixtures of two or more aldehydes can be used and the aldehyde may be furnished by an acetal, for example, a substituted benzaldehyde acetal, or the diacetate may be used. These compounds readily decompose in the presence of the condensation catalyst to yield the corresponding aldehyde.

In the following table are tabulated the comparative speed values for polymers made by condensing various aldehydes with selected vinyl acetophenone polymers.

In comparing the speeds of the polymers in the above table, it should be noted the mol percent of the light-sensitive groups in the polymers undoubtedly varies, since the aldehydes appear to vary in their reactivity with the acyl group of the polymers. Thus the polymer of Example 20 is considered to be fully reacted with the aldehydes and contains substantially no unreacted acetyl groups. A reduction in speed of this mixed benzalanisal styrene polymer is obtained by decreasing the reaction time to introduce fewer benzal and anisal groups into the polymer molecule. Example 22 also provides a polymer free of unreacted acetyl groups

*Example 1.—The preparation of polyvinyl acetophenone*

In an all glass vessel equipped with efficient stirrer, dropping funnel and reflux condenser was placed 268 g. (2 mols.) of finely divided anhydrous aluminum chloride and 1 liter of carbon disulfide. To the constantly stirred suspension was added 118 g. (1½ mol.) of acetyl chloride followed by a solution of 104 g. (1 mol.) of polystyrene in 1 liter of carbon disulfide. Addition of the polymer solution took about 15 minutes. The reaction mixture became warm and refluxed gently, with copious evolution of hydrogen chloride. No artificial heating or cooling was used. After about ½ hour the evolution of hydrogen chloride had greatly diminished, but stirring was continued another hour. The reaction mixture was then filtered by suction, about 75% of the carbon disulfide used was thus recovered, and the residue on the filter consisted of highly swollen discrete particles. These were dried rapidly in a gentle current of air to give a dusty yellow powder, which was thoroughly agitated with cold 5% hydrochloric acid for about 15 minutes. The polymer was filtered off and washed by stirring in several changes of cold water. On drying at 40–50° C. there was obtained 142–144 g. of a fine, white powder of low ash content. The analysis of this product showed a carbon content of 81.9% and a hydrogen content of 6.9%. The calculated values for pure polyvinyl acetophenone are C=82.2%, H=6.85%.

The above polymer proven to consist essentially of polyvinyl-p-acetophenone, may be further purified by dissolving it in acetone and pouring the colorless, slightly hazy solution into an excess of agitated water. The white, fibrous precipitate is again washed with water and dried. Found C=82.3, H=7.0.

The other acylated nuclear-substituted styrene and vinyl naphthalene polymers indicated above are prepared in this manner from the appropriate styrene or vinyl-naphthalene polymer, or can be obtained by polymerizing o-, m- or p-vinylacetophenone and acetonaphthones prepared by the method of the Williams invention above.

*Example 2.—Condensation of polyvinyl acetophenone with p-isopropyl benzaldehyde*

Five grams of polyvinyl acetophenone were dissolved in 90 g. of p-isopropyl benzaldehyde. To this was added 5 g. of a 10% (by weight) solution of concentrated sulfuric acid in p-isopropyl benzaldehyde. After standing at room temperature (75° F.) in a brown bottle for eighteen hours the solution was poured into an excess of stirred methanol. The slightly yellow, fibrous precipitate was leached in a number of changes of methanol, then dried in the dark at room temperature. The precipitate was redissolved in methyl ethyl ketone and again precipitated into methanol. Yield was 6.5 grams. Sensitometric evaluation indicated that this product had a speed of about 280.

*Example 3.—Condensation of polyvinyl acetophenone with anisaldehyde*

Five grams of polyvinyl acetophenone were dissolved in 100 cc. of glacial acetic acid containing 16 g. of anisaldehyde. To this was added 5 g. of a 10% (by weight) solution of concentrated sulfuric acid in glacial acetic acid and the solution was kept in a brown bottle at room

| Example | Vinyl Acetophenone Polymer | Benzaldehyde | Speed |
| --- | --- | --- | --- |
| 2 | VacP¹ | -i-C₃H₇ | 280 |
| 3 | VacP¹ | o-OCH₃ | 1,600 |
| 4 | VacP¹ | o-OCH₃ | 2,500 |
| 5 | VacP¹ | 3,4-di-OCH₃ | 2,800 |
| 6 | VacP¹ | p-OH | 2,500 |
| 7 | VacP¹ | p-(CH₃)₂N— | 1,000 |
| 8 | VacP¹ | p-(CH₃)₂N— | 10 |
| 9 | VacP¹ | o-Cl | 32 |
| 10 | VacP¹ | p-CH₃CONH— | 400 |
| 11 | VacP¹ | p-CH₃CONH— | 140 |
| 12, 21 | VacP¹ | o-SO₃H (Na salt) | 7 |
| 14 | VacP² | o-OCH₃ | 16; 200 |
| 20 | VacP¹ | o-OCH₃ and benzaldehyde | 13,000 |
| 17 | VacP³ | —OCH₃ | 65 |
| 19 | VacP¹ | 3,4-di-OCH₃ | |
| 4 | VacP⁴ | α-naphthaldehyde | |
| 22 | VacP¹ | —OCH₃ | |

¹ Polyvinylacetophenone (Example 1).
² Copolymer with isobutylene.
³ Copolymer with styrene.
⁴ Partially acetylated styrene.

temperature (75° F.) for twenty-four hours. The solution was then poured into a large excess of agitated ethyl alcohol, the precipitate leached in several changes of alcohol, pressed out and dried at room temperature. Yield was 5.8 grams. This was redissolved in methyl ethyl ketone and the solution precipitated into excess alcohol and dried in the dark. The product had a methoxyl content of 3.9% indicating that the content of p-methoxy benzal vinyl acetophenone was 21.6 mol. percent. Sensitometrically this sample showed a speed of about 2500.

When the above procedure was repeated but employing a reaction time of sixteen hours, a product was obtained which showed a speed of 1600.

*Example 4.—Condensation of polyvinyl acetophenone with anisaldehyde*

Five grams of polyvinyl acetophenone were dissolved in 100 g. of anisaldehyde. To this was added 5 g. of a 10% (by weight) solution of concentrated sulfuric acid in glacial acetic acid and the solution was stored in a brown bottle at room temperature (75° F.). After twenty-four hours the very dark red solution was poured into a large excess of ethyl alcohol, and the yellow precipitate was leached in several changes of ethyl alcohol, then pressed out and redissolved in methyl ethyl ketone containing a little anisaldehyde and reprecipitated into alcohol. Dried in the dark at room temperature. Yield was 7 grams This material showed a speed of 2800. When α-naphthaldehyde and β-methoxy-α-naphthaldehyde were used instead of anisaldehyde polymers of high light-sensitivity were obtained.

*Example 5.—Condensation of polyvinyl acetophenone and veratraldehyde*

5.0 grams of polyvinyl acetophenone were dissolved in a mixture of 80 g. of glacial acetic acid and 20 g. of veratraldehyde. To this was added 10.0 g. of a 10% (by weight) solution of concentrated sulfuric acid in glacial acetic acid. After 5½ hours the reddish dope was poured in a thin stream into an excess of stirred methanol. The orange, fibrous precipitate was filtered off and after expressing surplus methanol was redissolved in methyl ethyl ketone. This solution was poured into excess methanol. Again the precipitate was squeezed out and reprecipitated from methyl ethyl ketone solution into methanol, then pressed out and dried in the dark at room temperature. This material possessed a speed of about 2500.

*Example 6.—Condensation of polyvinyl acetophenone with p-hydroxy benzaldehyde*

Ten grams of polyvinyl acetophenone were dissolved in 180 g. of glacial acetic acid containing 30 g. of p-hydroxy benzaldehyde. To this was added 10 g. of a 10% (by weight) solution of concentrated sulfuric acid in glacial acetic acid, and the solution was allowed to stand in a brown bottle at room temperature (75° F.) After 5½ hours the reddish solution was poured in a thin stream into excess, agitated alcohol. The fibrous precipitate was leached in several changes of fresh alcohol, then pressed out and dried at room temperature. The product was redissolved in methyl ethyl ketone and this solution was poured into agitated, excess alcohol. The product, a very slightly yellow, fibrous precipitate, was dried in the dark at room temperature and weighed 11 grams. This polymer exhibited a speed of 1000.

*Example 7.—Condensation of polyvinyl acetophenone and p-dimethylamino benzaldehyde*

5.0 grams of polyvinyl acetophenone were dissolved in a mixture of 10 grams of p-dimethylamino benzaldehyde and 90 g. of benzophenone at 50° C. With the solution at 40° C. there was added to it 1.0 ml. of 40% solution of trimethyl benzyl ammonium hydroxide with vigorous stirring. After exactly three minutes at 40° C. a slight excess of glacial acetic acid was added to neutralize the alkali present. The resulting solution was poured into an excess of stirred methanol and the yellow, rubbery polymer was redissolved in methyl ethyl ketone. The solution was now precipitated into excess ethyl alcohol. Finally the polymer was again dissolved in methyl ethyl ketone and poured into excess, agitated warm water. The yellow fibrous polymer was dried at room temperature. The polymer showed a speed of 10.

*Example 8.—Condensation of polyvinyl acetophenone and p-dimethylamino benzaldehyde*

5.0 grams of polyvinyl acetophenone were mixed with 10 g. of p-dimethylamino benzaldehyde and 90 g. of benzophenone. The mixture was stirred at 50° C. to give a clear, yellow dope. To this was added 5 g. of a 10% solution (by weight) of concentrated sulfuric acid in glacial acetic acid. This was kept in a brown bottle at 50° C. for twenty-three hours. The resulting product was then poured in a thin stream into an excess of stirred methanol. The yellow, rubbery precipitate was pressed out and redissolved in methyl ethyl ketone. The solution was again poured slowly into an excess of methanol. The precipitate was redissolved in methyl ethyl ketone and this time the solution was poured slowly into agitated warm water to give a yellow, fibrous polymer which was leached in fresh, warm water, pressed out and dried at room temperature. This polymer displayed a speed of 32.

*Example 9.—Condensation of polyvinyl acetophenone with o-chlorobenzaldehyde*

Five grams of polyvinyl acetophenone were dissolved in a mixture of 100 cc. of glacial acetic acid and 18 g. of o-chlorobenzaldehyde. To this was added 5 g. of a 10% (by weight) solution of concentrated sulfuric acid in glacial acetic acid. The solution was stored in a brown bottle at room temperature (75° F.). After twenty-one hours the solution was poured slowly into an excess of stirred alcohol. The white precipitate was filtered off, and then squeezed out. This was leached in several changes of ethyl alcohol and dried at room temperature in subdued light. The polymer was then twice more dissolved in methyl ethyl ketone and precipitated by pouring the solution into excess of ethyl alcohol. The white, fibrous precipitate was pressed out and dried in subdued light. The sample contained 4.9% of chlorine indicating a 24.3 mol. percent content of the o-chlorobenzal acetophenone. The polymer when evaluated sensitometrically showed a speed of 400.

*Example 10.—Condensation of polyvinyl acetophenone and p-acetamino benzaldehyde*

Five grams of polyvinyl acetophenone were mixed with 10 g. of p-acetamino benzaldehyde and 75 cc. of glacial acetic acid. This was stirred until a clear solution was obtained, whereupon there was added 5 g. of a 10% solution (by weight) of concentrated sulfuric acid in glacial acetic acid and the solution was allowed to stand in a brown bottle at room temperature (75° F.). After twenty hours the product was poured in a thin stream into an excess of stirred methanol. The bright yellow, fibrous precipitate was leached in fresh methanol, pressed out and redissolved in methyl ethyl ketone. The solution was again precipitated into excess methanol and the precipitate pressed out and redissolved in methyl ethyl ketone. This solution was finally poured into an excess of agitated warm water and the yellow fibrous precipitate was dried at room temperature. The polymer exhibited a speed of 140 when evaluated sensitometrically.

*Example 11.—Condensation of polyvinyl acetophenone and p-acetamino benzaldehyde*

Five grams of polyvinyl acetophenone were dissolved in a mixture of 10 g. of p-acetamino benzaldehyde and 75 cc. of dried 1,4 dioxane. 1.0 g. of a 40% solution of benzyl trimethyl ammonium hydroxide were added. After exactly five minutes of stirring there was added a slight excess of glacial acetic acid to neutralize the alkali present. The solution was poured slowly into an excess of stirred methanol. The precipitate was again precipitated from methyl ethyl ketone into methanol and finally precipitated from methyl ethyl ketone into warm water. The white, fibrous polymer was dried at room temperature. The polymer showed a speed of 7.

*Example 12.—Condensation of polyvinyl acetophenone and sodium o-sulfobenzaldehyde*

Five grams of polyvinyl acetophenone was dissolved in a solution of 10 g. of sodium o-sulfobenzaldehyde and 75 cc. of glacial acetic acid. To the clear solution was added 10 g. of a 10% (by weight) solution of concentrated sulfuric acid in glacial acetic acid. The resulting solution was stored in a brown bottle at 30–32° C. for eight hours, at the end of which time the product was poured in a thin stream into distilled water. The white, fibrous precipitate was thoroughly washed with distilled water and then dried at room temperature. The product was not soluble in acetone but was readily soluble in mixtures of acetone and water. Sensitometrically it showed a speed of 16.

*Example 13.—Preparation of a copolymer of vinyl acetophenone and isobutylene*

One-hundred sixty grams of a copolymer of styrene and isobutylene (consisting of essentially equimolecular proportions of the two monomers) were dissolved in 1 liter of carbon disulfide. In a 5 l. flask fitted with an efficient glass stirrer, condenser and dropping funnel was suspended 268 g. of anhydrous aluminum chloride in 1 liter of carbon disulfide. To this was then added 118 g. of acetyl chloride. While this suspension was well stirred, the solution of the polymer was added over a period of ten minutes. Copious evolution of hydrogen chloride took place and a loose bulky precipitate formed. After the addition of the polymer was complete, stirring was continued for another hour. The product was filtered and the crumbly polymer dried in a current of air. The dried polymer was crushed up fine and stirred up with an excess of ice cold 5% hydrochloric acid solution. The polymer was filtered off by suction and washed thoroughly with water to remove excess acid. Dried at 40° C. Yield about 180 grams.

*Example 14.—Condensation of a copolymer of vinyl acetophenone and isobutylene with anisaldehyde*

Ten grams of a copolymer of vinyl acetophenone and isobutylene (made as above) were dissolved in a mixture of 160 cc. dioxane and 20 g. anisaldehyde. To this was then added with stirring, a solution of 1.0 g. of concentrated sulfuric acid in 10 cc. of dioxane. After twenty-three hours at room temperature the resulting solution was poured into excess stirred methanol, the slightly soft, fibrous precipitate being leached in fresh methanol, then pressed out and redissolved in dioxane. This solution was again poured into excess, agitated methanol. The precipitate was again dissolved in dioxane and this time precipitated into warm water. The white, rubbery polymer was leached in fresh water, then squeezed out and dried in the dark at room temperature. This material was light-sensitive.

A copolymer of styrene and vinyl acetophenone can be prepared in two ways: (1) by the copolymerization of styrene and vinyl acetophenone and (2) by the incomplete acetylation of polystyrene by acetyl chloride in the presence of anhydrous aluminum chloride. The following examples demonstrate the two procedures and the subsequent condensations of the products obtained with aromatic aldehydes.

*Example 15.—The preparation of monomeric vinyl acetophenone*

Polyvinyl acetophenone (prepared by the reaction of acetyl chloride on polystyrene in the presence of anhydrous aluminum chloride, as described in the Kenyon et al. U. S. application, Serial No. 246,519, filed concurrently herewith) was heated in a distilling apparatus with the bare flame of a gas burner, the system being evacuated to 1 mm. pressure. 85% yield of a light brown oil was obtained which readily crystallized on chilling. This product was redistilled and a very pale yellow oil was collected which distilled at 93–98° C. at 0.5 mm. Hg pressure.

The distillate crystallized and this was recrystallized twice from ligroin (B. P. 60–90° C.) by chilling the solution thoroughly. White crystalline plates were obtained which melted at 34° C. Titration of a sample of this for double bond by means of bromine indicated a 98.9% content of vinyl acetophenone.

The isomeric vinyl acetophenones and acetonaphthones can also be prepared by the methods of the mentioned Williams invention. That method is used in particular when preparing the monomeric ketones the aryl nucleus of which is substituted with groups such as hydroxyl, amino, sulfa and carboxyl.

*Example 16.—The copolymerization of vinyl acetophenone with styrene*

Five grams of vinyl acetophenone were mixed with 3.6 g. of freshly distilled styrene together with 0.043 g. of benzoyl peroxide and 25 cc. of methyl ethyl ketone. This solution was refluxed gently on the steam bath for twenty-four hours. The resulting viscous, clear, colorless solution was poured into an excess of agitated methanol. The while, friable polymer was leached in fresh methanol, then dried at 40° C. Found C=84.1%, H=7.2%. Calculated C, 86.4%; H, 7.2%.

*Example 17.—Condensation of copolymer of styrene and vinyl acetophenone with anisaldehyde*

Four grams of the copolymer of vinyl acetophenone and styrene were dissolved in 20 cc. of glacial acetic acid together with 10 g. of anisaldehyde. Two grams of a 10% solution (by weight) of concentrated sulfuric acid in glacial acetic acid were then added. After twenty-three hours' standing in a brown bottle at room temperature the resulting solution was poured into an excess of stirred methanol. The precipitate was leached in fresh methanol. The precipitate was thereupon precipitated twice from methyl ethyl ketone solution into methanol. A white, friable precipitate was obtained. Speed=65.

*Example 18.—The preparation of a partially acetylated polystyrene*

Fifty-two grams of polystyrene were dissolved in 500 cc. of carbon disulfide. This was added to a suspension of 62 g. of anhydrous aluminum chloride in 500 cc. of carbon disulfide contained in a 3-liter glass flask fitted with an efficient glass stirrer, condenser and dropping funnel. While the mixture was being vigorously stirred, a mixture of 30 g. of acetyl chloride and 100 cc. of carbon disulfide were added dropwise. During this addition the reaction mixture soon became thick and gelatinous and another 500 cc. of carbon disulfide were added. Stirring was continued and more of the acid chloride mixture was cautiously added and soon the gel structure collapsed and a suspension of highly swollen polymer particles suspended in the carbon disulfide was obtained. The remainder of the acid chloride could now be added at a faster rate. Copious evolution of hydrogen chloride was observed and stirring was continued for another hour after the addition of the acid chloride was complete. The mixture was then filtered and dried in a current of air. The crumbly product was broken up fine and added to a well-stirred ice cold 5% hydrochloric acid solution.

The white suspension was filtered off and washed with water and dried. The white, dry polymer was dissolved in dioxane, the solution filtered and the filtrate was poured slowly into an excess of agitated methanol. The white, fibrous precipitate was washed throughly in water, then dried at 40° C.

*Example 19.—Condensation of a partially acetylated polystyrene with veratraldehyde*

Ten grams of partially acetylated polystyrene, prepared as above, were dissolved in 150 g. of dry dioxane and 25 g. of veratraldehyde. To this was added 10 g. of a 10% (by weight) solution of concentrated sulfuric acid in glacial acetic acid. The solution was stored in a brown bottle at room temperature (25° C.) for 7½ hours. At the end of this period the solution was poured in a thin stream into agitated, excess methanol. The tan, fibrous precipitate was filtered off, leached in fresh methanol and redissolved in methyl ethyl ketone. This solution was again poured into excess methanol and the fibrous precipitate was filtered off and finally precipitated again from methyl ethyl ketone solution into hot water. This polymer was light-sensitive.

*Example 20.—Condensation of polyvinyl acetophenone with a mixture of benzaldehyde and anisaldehyde*

Ten grams of polyvinyl acetophenone were dissolved in a mixture of 78 g. of benzaldehyde and 112 g. of anisaldehyde, and to this was added 10 g. of a 10% solution (by weight) of concentrated sulfuric acid in benzaldehyde. The product was allowed to stand in a brown bottle at room temperature (30–32° C.) for 97 hours. Thereupon the reddish solution was poured slowly into excess of stirred methanol. The precipitate was then redissolved in methyl ethyl ketone containing some benzaldehyde. Once more the precipitate was redissolved in a mixture of methyl ethyl ketone and benzaldehyde and precipitated again into methanol. The precipitate was leached in fresh methanol and air dried in dark. The sensitometric speed of this material was 13000.

It is not understood why this synergistic effect is obtained i. e., neither vinyl benzal or anisal acetophenone, polymers alone possess speed in this range.

*Example 21.—The condensation of polyvinyl acetophenone with sodium o-sulfo-benzaldehyde*

Five grams of polyvinyl acetophenone were dissolved in a mixture of 80 cc. of dioxane and 20 cc. of alcohol. Ten grams of sodium o-sulfobenzaldehyde (the technical product was twice recrystallized from alcohol) were added to the stirred solution. With efficient stirring there was added to the slurry 20 g. of a solution made up of one part by weight of a 40% aqueous trimethylbenzyl ammonium hydroxide solution and 19 parts of water. The addition was made dropwise over a period of 10 minutes. The resulting solution was clear, but after 30 minutes it began to show cloudiness. Five cc. of water were added to clear it, followed by another 5 cc. 30 minutes later. After standing for a total of two hours at room temperature the solution was acidified with a little acetic acid and poured into an excess of acetone. The precipitate was filtered off and redissolved in water containing a little acetone. Again the solution was poured into excess acetone. The precipitate was then leached in fresh acetone, filtered off and dried in vacuo. The product was soluble in 25% (by weight) of acetone in water or a 30% solution (by weight) of alcohol in water. The polymer contained 5.9% sulfur (41.4 mol percent) of sodium o-sulfabenzalacetophenone groups. Speed=200.

*Example 22.—Condensation of polyvinylacetophenone with anisaldehyde*

This polymer was obtained by fully reacting the acetyl groups of polyvinyl acetophenone with anisaldehyde as follows:

Five grams of polyvinylacetophenone were dissolved in 150 grams of anisaldehyde and to this was added 15 grams of a 10% (by weight) solution of concentrated sulfuric acid in glacial acetic acid. This was allowed to stand in the dark for 100 hours at 25–30° C. Thirty grams of a 10% sodium acetate solution in glacial acetic acid were stirred into this solution which was further diluted with methyl ethyl ketone. This solution was poured into an excess of stirred methanol, the precipitate leached in fresh methanol, then was thoroughly washed in running cold water. The product was dried in the dark at room temperature. Yield=9 grams and the product possessed a methoxyl content of 11.6% indicating that substantially no unreacted acetyl groups were contained in the polymers. The polymer possessed a high degree of light-sensitivity.

In addition to the vinyl acetophenone polymers given in the above examples can be used acylated polymers, e. g. of d-methyl-, m-methyl-, 2,5-dimethyl-, ethyl- o-hydroxy-, o-, m-, p-chloro- or bromo-, p-benzyl-, 3,4-dichloro-, 3,4-dimethoxy-, m-tert. butyl-styrenes, o- and m-methoxy styrenes, p-phenoxy styrene, etc., and copolymers of mixtures of 5–95 mol percent of these acylated styrenes or of these styrenes polymerized with polymerizable compounds such as styrene, acrylonitrile, vinyl acetate, vinyl ethers, acrylic and alkacrylic acids and esters, maleic anhydride, etc. The homologous vinyl propiophenone etc. polymers are of less value for the preparation of light-sensitive polymers. However, copolymers containing both vinyl acetophenone and vinyl propiophenone units are very useful in the invention.

In general the polymer reacted with the aldehyde need only contain a selected proportion, 100 mol percent or less, of the indicated $-CO(CH_2)_{n-1}CH_3$ groups $n=1$ to 4. To this end the vinyl ketone polymers such as methyl vinyl ketone homo- or copolymers with other polymerizable compounds such as methyl methacrylate, are useful. In this case the arylidene acetyl group obtained is attached directly to carbon chain of the polymer rather than indirectly as is the case when the aldehyde is reacted with polymers such as polyvinyl acetophenone.

Results similar to those of the above examples are obtained by condensing the benzaldehyde as above with homopolymers and copolymers of the o-, m- and p-acylated styrenes and vinyl naphthalenes prepared by the methods of the Williams invention. For example, substantially no difference in physical and chemical properties could be detected between the vinyl benzalacetophenone polymer of Example 4 and one obtained from p-vinylacetophenone (from p-ethylacetophenone) by condensation with the benzaldehyde. Similarly copolymers of the isomeric acylated vinyl benzenes and naphthalenes behave similarly when condensed with the benzaldehyde.

The polymers of the invention can be sensitized so as to further increase their sensitivity to light by use of the nitro compounds of Minsk et al. U. S. patent application Serial No. 148,684, filed March 9, 1950, and the triphenylmethane, anthrone, quinone and ketone compounds of the Minsk et al. applications Serial Nos. 207,048–51, filed January 20, 1951, particularly those acylated vinyl benzene and naphthalene polymers having inherently low light sensitivity before sensitization, of the order of 100. Contrary to this, the light-sensitive polymers of the Allen et al. invention above are not sensitized by those compounds.

The polymers of the invention are particularly useful for photomechanical purposes where it is desired to prepare a resist image on a given surface. For example, the polymer is coated from solvent upon a support such as a metal plate, paper, or organic colloid surface; for example, especially upon a surface which when moistened repels greasy printing inks, such as a lithographic paper plate, and after exposure to the desired line or halftone subject, the unexposed areas are dissolved away, leaving a resist image on the original support. At this stage, if the resist has been formed on a surface repelling greasy inks when moistened, the element can be used directly as a printing plate. In other cases, the support, such as a metal plate, can be etched out in a well known manner to obtain an etched metal printing plate. Other uses for our polymers employing their light-sensitive properties will occur to those skilled in the art. For example, the polymers can be employed to form continuous soluble or insoluble coatings on any surface or object to which they will adhere, in the latter case exposure to light being employed to insolubilize the coating.

The light-sensitive polymers can be used for photographic reproduction of line, half-tone or continuous tone subjects. In the latter case it is preferable to coat the polymer on a transparent support, expose the coating thru the support followed by washing away the least exposed areas with solvent leaving a continuous tone relief image on the support which may be colored previously or subsequently with subtractively colored dyes for purposes of color photography. Three such subtractively colored reliefs corresponding to blue, green and red aspects of a subject can then be superimposed to obtain a natural color reproduction or three such images may be formed on a single support by successively coating layers of the polymers, or the support after first forming relief images thereon corresponding to one or more of the red, green or blue aspects of the original subject. Thus forming a yellow colored relief on the support, a layer of polymer is coated thereon and the magenta relief is formed on top of the yellow relief and the cyan similarly.

In our application Serial No. 246,517, filed concurrently herewith, are described and claimed comparable condensation products of vinyl acetophenone and naphthone polymers with benzaldehyde which generally are less light-sensitive than the vinyl-benzal acetophenone and naphthone polymers of this invention. However, as is apparent, the mixed aldehyde condensates (benzaldehyde and another aromatic aldehyde) of the polymers containing acetyl groups possess exceptionally high light-sensitivity.

What we claim is:

1. A process for preparing a polymer which comprises acetylating aromatic nuclei of a styrene polymer and condensing the resulting polyvinyl acetophenone polymer with an aromatic aldehyde having the general formula

R—CHO wherein R represents a univalent aromatic monocyclic radical of the benzene series whose free valence belongs to the aromatic nucleus, there being no more than four hydrogen atoms attached directly to the carbon atoms of said nucleus, in the presence of an acid condensation catalyst.

2. A process for preparing a polymer which comprises condensing with an aromatic aldehyde having the general formula

R—CHO wherein R represents a univalent aromatic monocyclic radical of the benzene series whose free valence belongs to the aromatic nucleus, there being no more than four hydrogen atoms attached directly to the carbon atoms of said nucleus, a polymer of a compound having the general formula $CH_2=CH—D—CO—CH_3$ wherein D represents a bivalent aromatic radical whose free valences belong to the aromatic nucleus and which radical is selected from the group consisting of monocyclic radicals of the benzene series and bicyclic radicals of the naphthalene series, in the presence of a condensation catalyst.

3. A process for preparing a polymer which comprises condensing an aromatic aldehyde having the general formula

R—CHO wherein R represents a univalent aromatic monocyclic radical of the benzene series whose free valence belongs to the aromatic nucleus, there being no more than four hydrogen atoms attached directly to the carbon atoms of said nucleus, with a polymer containing recurring groups having the general formula $—CH_2—CH—D—CO—(CH_2)_{n-1}CH_3$ wherein n represents a positive integer of from 1 to 4 and D represents a bivalent aromatic radical whose free valences belong to the aromatic nucleus and which radical is selected from the group consisting of monocyclic radicals of the benzene series and bi-cyclic radicals of the naphthalene series, in the presence of a condensation catalyst.

4. A process for preparing a polymer which comprises condensing a polymer of an ar-vinyl acetophenone with a mixture of aromatic aldehydes having the general formula

R—CHO wherein R represents a univalent aromatic monocyclic radical of the benzene series whose free valence belongs to the aromatic nucleus, there being no more than four hydrogen atoms attached directly to the carbon atoms of said nucleus, in the presence of a condensation catalyst.

5. A process for preparing a polymer which comprises condensing a polymer of a compound having the general formula $CH_2=CH—D—CO—CH_3$ wherein D represents a monocyclic arylene group of the benzene series, with an aromatic aldehyde having the general formula

R—CHO wherein R represents a univalent aromatic monocyclic radical of the benzene series whose free valence belongs to the aromatic nucleus, there being no more than four hydrogen atoms attached directly to the carbon atoms of said nucleus, in the presence of a condensation catalyst.

6. A process for preparing a polymer which comprises condensing a poly-ar-vinyl acetophenone polymer with an aromatic aldehyde having the general formula

R—CHO wherein R represents a univalent aromatic monocyclic radical of the benzene series whose free valence belongs to the aromatic nucleus, there being no more than four hydrogen atoms attached directly to the carbon atoms of said nucleus, in the presence of a condensation catalyst, thereby obtaining a vinyl benzalacetophenone polymer.

7. A process for preparing a polymer which comprises acetylating aromatic nuclei of a styrene polymer and condensing the resulting ar-vinyl acetophenone polymer with an aromatic aldehyde having the general formula

R—CHO wherein R represents a univalent aromatic monocyclic radical of the benzene series whose free valence belongs to the aromatic nucleus, there being no more than four hydrogen atoms attached directly to the carbon atoms of said nucleus, in the presence of a condensation catalyst.

8. A process for preparing a polymer which comprises polymerizing an ar-vinyl acetophenone and condensing acetyl groups of the resulting polymer with the aldehyde group of an aromatic aldehyde having the general formula

R—CHO wherein R represents a univalent aromatic monocyclic radical of the benzene series whose free valence belongs to the aromatic nucleus, there being no more than four hydrogen atoms attached directly to the carbon atoms of said nucleus, in the presence of a condensation catalyst.

9. A process for preparing a polymer which comprises partially acetylating the aromatic nuclei of a styrene polymer and condensing acetyl groups of the resulting polymer with an aromatic aldehyde having the general formula

R—CHO wherein R represents a univalent aromatic monocyclic radical of the benzene series whose free valence belongs to the aromatic nucleus, there being no more than four hydrogen atoms attached directly to the carbon atoms of said nucleus, in the presence of a condensation catalyst.

10. A process for preparing a polymer which comprises polymerizing an ar-vinyl acetophenone with an ar-vinyl benzene and condensing acetyl groups of the resulting co-polymer with an aromatic aldehyde having the general formula

R—CHO wherein R represents a univalent aromatic monocyclic radical of the benzene series whose free valence belongs to the aromatic nucleus, there being no more than four hydrogen atoms attached directly to the carbon atoms of said nucleus, in the presence of a condensation catalyst.

11. A process for preparing a polymer which comprises condensing a poly-ar-vinyl acetophenone polymer with an alkoxy benzaldehyde in the presence of a condensation catalyst.

12. A process for preparing a polymer which comprises condensing a poly-ar-vinyl acetophenone polymer with anisaldehyde in the presence of a condensation catalyst.

13. A process for preparing a polymer which comprises condensing polyvinyl acetophenone with benzaldehyde and anisaldehyde in the presence of a condensation catalyst.

14. The process of claim 13 wherein the condensation catalyst is sulfuric acid.

15. A polymer capable of forming a continuous coating on a base and containing recurring units having the structure

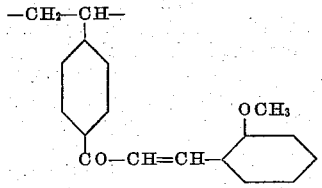

16. A polymer capable of forming a continuous coating on a base and containing a mixture of recurring units having the structure

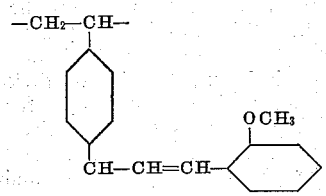

and

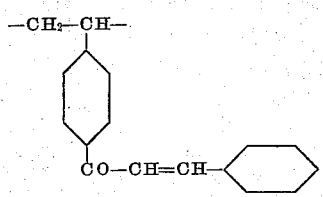

References Cited in the file of this patent

UNITED STATES PATENTS

| | | |
|---|---|---|
| 2,332,897 | D'Alelio | Oct. 26, 1943 |
| 2,561,814 | Novotny et al. | July 24, 1951 |
| 2,566,302 | Allen et al. | Sept. 4, 1951 |